(12) United States Patent
Christiansen et al.

(10) Patent No.: US 11,879,501 B2
(45) Date of Patent: Jan. 23, 2024

(54) CONNECTION SYSTEM FOR JOINING WIND TURBINE COMPONENTS AND ASSOCIATED METHOD

(71) Applicant: Vestas Wind Systems A/S, Aarhus (DK)

(72) Inventors: Thomas Møller Christiansen, Hjortshøj (DK); Nicolaj Biltoft Kristensen, Silkeborg (DK); Erik Markussen, Videbæk (DK)

(73) Assignee: Vestas Wind Systems A/S, Aarhus N (DK)

( * ) Notice: Subject to any disclaimer, the term of this patent is extended or adjusted under 35 U.S.C. 154(b) by 311 days.

(21) Appl. No.: 16/981,454

(22) PCT Filed: Mar. 26, 2019

(86) PCT No.: PCT/DK2019/050104
§ 371 (c)(1),
(2) Date: Sep. 16, 2020

(87) PCT Pub. No.: WO2019/185100
PCT Pub. Date: Oct. 3, 2019

(65) Prior Publication Data
US 2021/0025455 A1    Jan. 28, 2021

(30) Foreign Application Priority Data

Mar. 28, 2018 (DK) .......................... PA 2018 70190

(51) Int. Cl.
*F16C 43/02* (2006.01)
*F03D 13/00* (2016.01)

(52) U.S. Cl.
CPC .............. *F16C 43/02* (2013.01); *F03D 13/00* (2016.05); *F05B 2230/604* (2013.01); *F05B 2260/30* (2013.01); *F16C 2360/31* (2013.01)

(58) Field of Classification Search
CPC ............ F05B 2230/604; F05B 2260/30; F03D 13/00; F16C 43/02; F16C 2360/31
See application file for complete search history.

(56) References Cited

U.S. PATENT DOCUMENTS

2006/0213145 A1   9/2006 Haller
2008/0080946 A1   4/2008 Livingston et al.
(Continued)

FOREIGN PATENT DOCUMENTS

| CN | 201953565 U | 8/2011 |
| CN | 203130388 U | 8/2013 |
| WO | 2018019350 A1 | 2/2018 |

OTHER PUBLICATIONS

Danish Patent and Trademark Office, Search and Examination Report in PA 2018 70190, dated Oct. 18, 2018.
(Continued)

*Primary Examiner* — Moshe Wilensky
(74) *Attorney, Agent, or Firm* — Wood Herron & Evans LLP (57) ABSTRACT

A connection system for joining two wind turbine components together includes one or more bearing surfaces and one or more support surfaces extending away from the one or more bearing surfaces on a first wind turbine component, and one or more bearing surfaces and one or more support surfaces extending away from the one or more bearing surfaces on a second wind turbine component. One or more bores are formed in the one or more support surfaces of the first and second wind turbine components. One or more pins are configured to be engaged with respective one or more bores of the first and second wind turbine components to thereby join the two components together. A method for joining two wind turbine components together is also disclosed.

20 Claims, 7 Drawing Sheets (56) References Cited

U.S. PATENT DOCUMENTS

| | | |
|---|---|---|
| 2010/0171317 A1 | 7/2010 | Trede |
| 2010/0226785 A1 | 9/2010 | Livingston et al. |
| 2017/0261402 A1 | 9/2017 | Christensen |
| 2020/0378368 A1* | 12/2020 | Aitken .................... F03D 13/10 |

OTHER PUBLICATIONS

European Patent Office, International Search Report and Written Opinion in PCT Application No. PCT/DK2019/050104, dated Jul. 9, 2019.

* cited by examiner

CONNECTION SYSTEM FOR JOINING WIND TURBINE COMPONENTS AND ASSOCIATED METHOD

TECHNICAL FIELD

The invention relates generally to wind turbines, and more particularly to an improved connection system including one or more tapered pins for joining two wind turbine components together with a sufficient clamping force, and a method of joining two wind turbine components together with one or more tapered pins in an improved manner.

BACKGROUND

Wind turbines are used to produce electrical energy using a renewable resource and without combusting a fossil fuel. Generally, a wind turbine converts kinetic energy from the wind into electrical power. A conventional horizontal-axis wind turbine installation includes a foundation, a tower supported by the foundation, and an energy generating unit positioned atop of the tower. The energy generating unit typically includes a nacelle to house a number of mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with a large number of wind turbine installations being located both on land and offshore.

As noted above, the nacelle houses a number of wind turbine components which must be fastened to the supporting structure of the nacelle. In this regard, the nacelle typically has an underlying structural frame, typically referred to as the base frame, that supports the wind turbine components thereon. For example, the main bearing housing which rotatably supports the main shaft is supported by and coupled to the base frame. The gear box and generator may also be supported by and coupled to the base frame. In a typical nacelle build out, these components will be coupled to the base frame of the nacelle through a plurality of bolted connections. In this regard, a relatively large number of bolts are typically used to secure these components to the base frame. By way of example, for large scale wind turbines, anywhere between 8 and up to 40 separate bolted connections may be used to secure the main bearing housing to the base frame of the nacelle.

Such an arrangement of bolted connections presents a number of challenges to wind turbine manufacturers, installers and operators. For example, and as an initial matter, the particular bolt pattern (e.g., location, size, relation to adjacent bolts, etc.) between the two wind turbine components is the subject of much analysis to ensure a good connection. Additionally, the amount of labor and assembly time to achieve the coupling of the wind turbine components is oftentimes significant. In this regard, the tightening of the large number of bolted connections must be done in a particular order and in a number of steps (e.g., not tightened all at once) to ensure a generally uniform distribution of the clamping forces between the two wind turbine components. Moreover, the large number of bolted connections must be precisely located on the wind turbine components such that when the two components are positioned relative to each other during assembly, the corresponding bolt holes are generally aligned so as to receive the bolts therethrough. Maintaining such precision in the large number of connections is difficult and requires high tolerances in the machining and processing of the two components that are subject to the connection. If high tolerances are not maintained, the bolt patterns between the two components may become misaligned, and thus incapable of being coupled together. Remedial measures must then be taken to correct the misalignment, which can be costly in terms of both time and money.

Of course wind turbines are subject to wear and fatigue during operation, and thus are typically subject to maintenance and repair procedures during the lifetime of the wind turbine. In some cases, for example, wind turbine components may have to be disassembled, removed from the wind turbine, and replaced with new or refurbished components. In these cases, the time and labor needed to achieve the repair or replacement may be significant. For example, much like during assembly, disassembly of the many bolted connections may need to be done in a particular order and in multiple steps. The insertion of the new or refurbished wind turbine component is then subject to the same assembly issues identified above, including the time and labor to achieve the large number of bolted connections and the high tolerance required to ensure an alignment of the bolt patterns between the two joined wind turbine components.

In addition to the above, the bolted connections joining two wind turbine components may on rare occasions become loosened over time. Experience has shown that when a particular bolted connection becomes loose, the bolted connections in the immediate vicinity of the loosened connection have a greater chance of becoming loose over time. Accordingly, periodic checks of the bolted connections may be part of maintenance procedures to ensure the integrity of the connections. Should a bolted connection have loosened or even been subject to failure, then a full analysis may have to be performed to determine what caused the slippage or failure. Such analyses are generally costly and time consuming.

Accordingly, while bolted connections are generally sufficient for their intended purpose and the industry-standard way of connecting various wind turbine components together, wind turbine manufacturers, installers and operators are seeking improved options for coupling wind turbine components together in a manner that not only ensures a strong connection, but also provides an efficient process for assembly, disassembly, repair, replacement, etc. of wind turbine components.

SUMMARY

To these and other ends, aspects of the invention are directed to a connection system for joining two wind turbine components together. The connection system includes one or more bearing surfaces on a first wind turbine component and one or more support surfaces extending away from the one or more bearing surfaces on the first wind turbine component. The connection system also includes one or more bearing surfaces on a second wind turbine component and one or more support surfaces extending away from the one or more bearing surfaces on the second wind turbine component. One or more bores are formed in the one or more support surfaces of the first wind turbine components and one or more bores are also formed in the one or more support surfaces of the second wind turbine component. One or more pins are configured to be engaged with respective one or more bores of the first and second wind turbine components to thereby join the two components together. When the first and second wind turbine components are to be joined, the two components are positioned relative to each other such that the one or more bearing surfaces generally confront each other. Additionally, the one or more support surfaces generally confront each other, and the one or more bores in the first and second wind turbine components are generally aligned with each other or become generally aligned with each other upon engagement of the one or more pins.

In an exemplary embodiment, the one or more bearing surfaces of the first wind turbine component may be oriented in a substantially horizontal direction and the one or more support surfaces of the first wind turbine component may be oriented in a substantially vertical direction. In a similar manner, the one or more bearing surfaces of the second wind turbine component may be oriented in a substantially horizontal direction and the one or more support surfaces of the second wind turbine component may be oriented in a substantially vertical direction. Additionally, for the first wind turbine component, the one or more support surfaces may extend away from the one or more bearing surfaces in a substantially perpendicular direction. Likewise, for the second wind turbine component, the one or more support surfaces may extend away from the one or more bearing surfaces in a substantially perpendicular direction.

In an exemplary embodiment, the one or more pins may have a tapered configuration or profile along at least a portion thereof. For example, the one or more pins may have a tapered configuration along substantially the entire length of the pins. Additionally, the one or more bores in the first or second wind turbine component may have a tapered configuration or profile along at least a portion thereof. For example, the one or more bores may have a tapered configuration along substantially the entire length of the bores. In an exemplary embodiment, the one or more bores in each of the first and second wind turbine components have a tapered configuration. The tapered configuration of the bores in the first and second components may generally be the same.

In an exemplary embodiment, the first wind turbine component includes the base frame of a nacelle of a wind turbine and the second wind turbine component includes a main bearing assembly of the wind turbine. In an alternative embodiment, the first wind turbine component includes the base frame of the nacelle and the second wind turbine component includes a structural beam of the nacelle frame. The connection system may be used to connect other wind turbine components together.

In another embodiment, a method of joining a first wind turbine component and a second wind turbine component includes providing the first wind turbine component with one or more bearing surfaces, one or more support surfaces extending away from the one or more bearing surfaces, and one or more bores formed in the one or more support surfaces; providing the second wind turbine component with one or more bearing surfaces, one or more support surfaces extending away from the one or more bearing surfaces, and one or more bores formed in the one or more support surfaces; positioning the first wind turbine component relative to the second wind turbine component such that the one or more bearing surfaces of the first and second components generally confront each other, the one or more support surfaces of the first and second wind turbine components generally confront each other, and the one or more bores of the first and second components are generally aligned with each other; and engaging one or more pins with the one or more bores in the first and second wind turbine components to thereby join the first and second wind turbine components together.

In an exemplary embodiment, the one or more pins have a tapered configuration or profile, and the one or more bores in the first and/or second wind turbine components have a tapered configuration or profile. Through this configuration, engaging the one or more pins with the one or more bores produces a clamping force between the first and second wind turbine components. More particularly, through this configuration increasing or decreasing the depth of engagement of the one or more pins with the one or more bores varies the clamping force between the first and second wind turbine components. Moreover, engagement of the one or more pins with the one or more bores in the first and second wind turbine components causes the one or more bores to become more aligned with each other.

Furthermore, according to an aspect of the invention engaging the one or more pins with the one or more bores includes inserting the one or more pins in the one or more bores by movement of the one or more pins in a direction generally parallel to the one or more bearing surfaces of the first and second wind turbine components. Additionally, in one embodiment, positioning the first and second wind turbine components relative to each other includes positioning the two components such that the one or more bearing surfaces contact each other.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
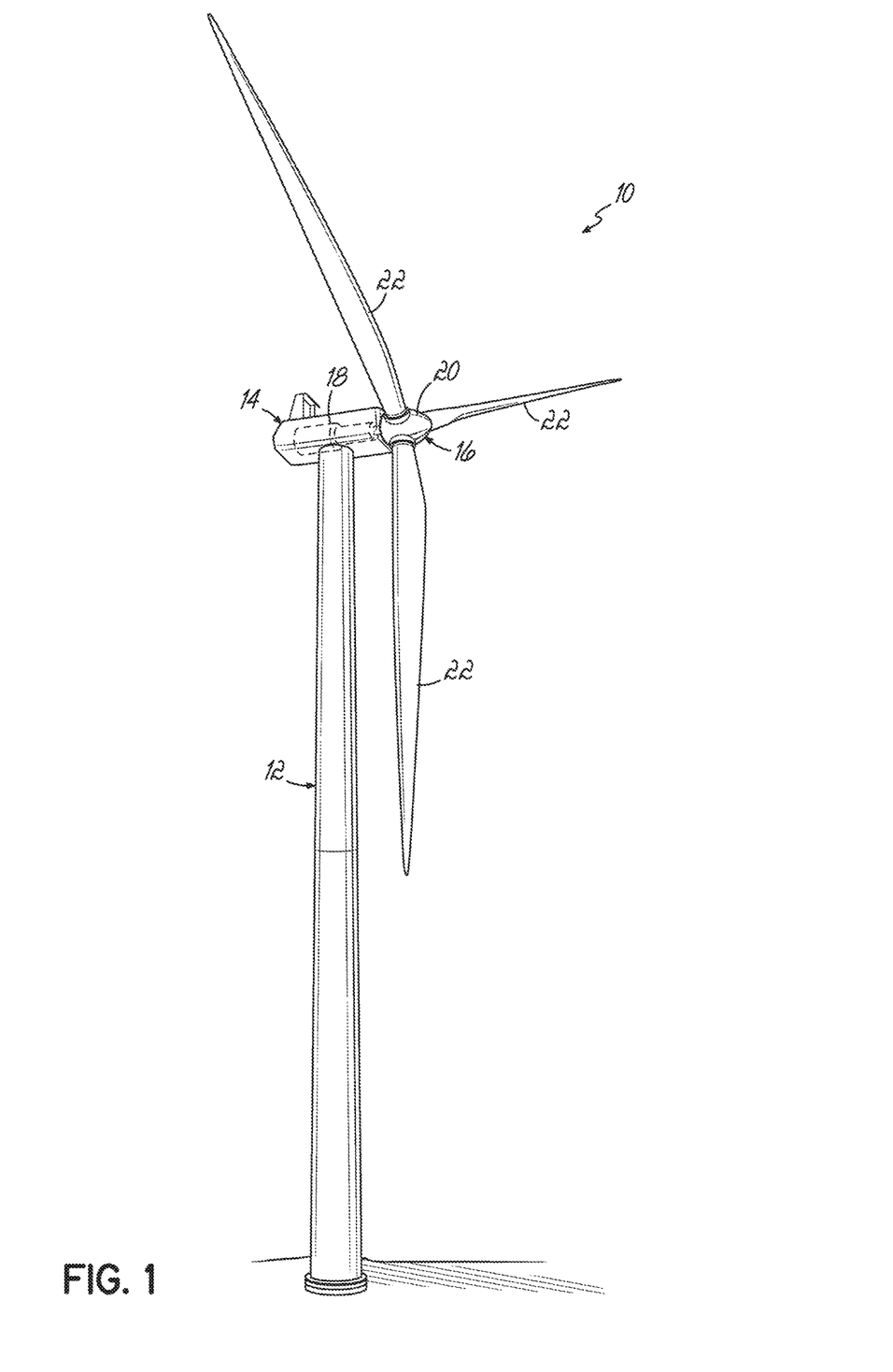
FIG. 1 is a diagrammatic perspective view of a wind turbine.
Figure 2:
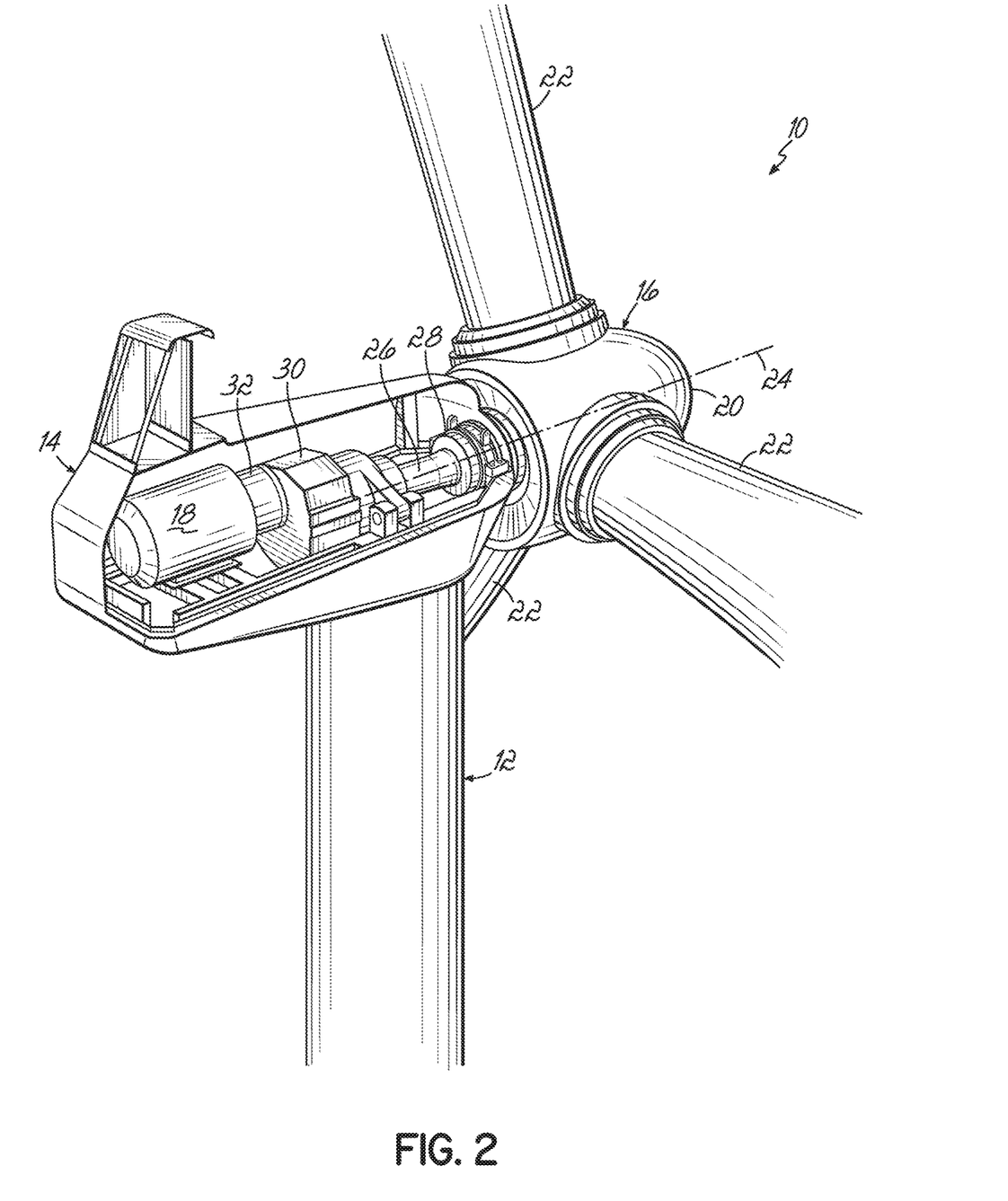
FIG. 2 is a perspective view of an upper portion of the wind turbine of FIG. 1.

With reference to FIGS. 1 and 2 and in accordance with an embodiment of the invention, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14, and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of the wind turbine 10 includes a hub 20 and at least one rotor blade 22 that projects outwardly from the hub 20. In the representative embodiment, the rotor 16 includes three rotor blades 22 at locations circumferentially distributed thereabout, but the number may vary. The rotor blades 22 are configured to interact with the passing air flow to produce lift that causes the hub 20 to spin about a longitudinal axis 24. The design and construction of the rotor blades 22 are familiar to a person having ordinary skill in the art and will not be further described.

The rotor 16 is mounted on an end of a main rotary shaft 26 that extends into the nacelle 14 and is rotatably supported therein by a main bearing assembly 28 coupled to the base frame of the nacelle 14. The main rotary shaft 26 is coupled to a gearbox 30 having as an input the main rotary shaft 26 an output a secondary rotary shaft 32. The main rotary shaft 26 has a relatively low angular velocity, while the secondary rotary shaft 32 has a higher angular velocity and is operatively coupled to the generator 18.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

Figure 3A:
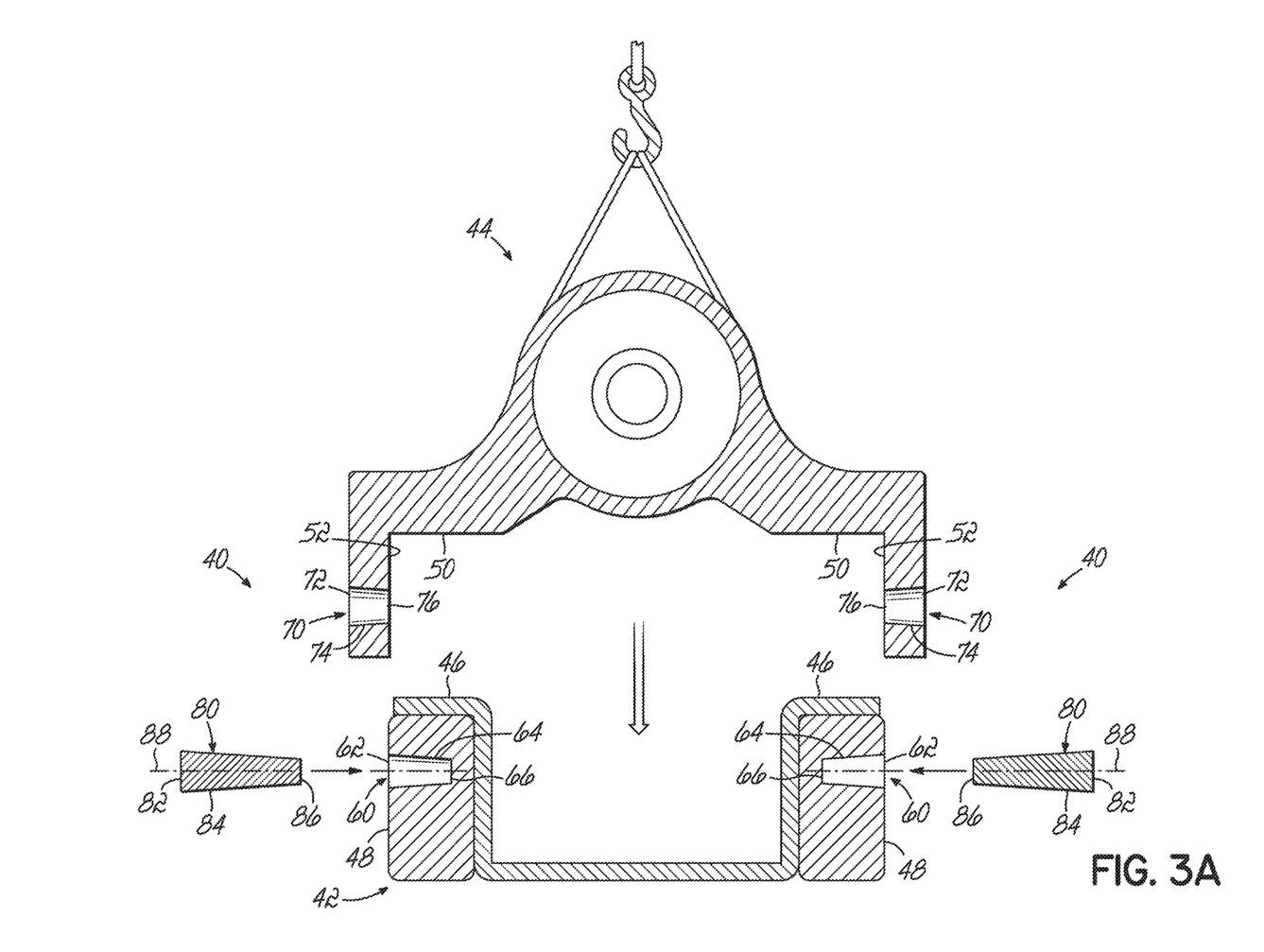
FIG. 3A is a disassembled cross-sectional view of a connection system for connecting two wind turbine components together.
Figure 3B:
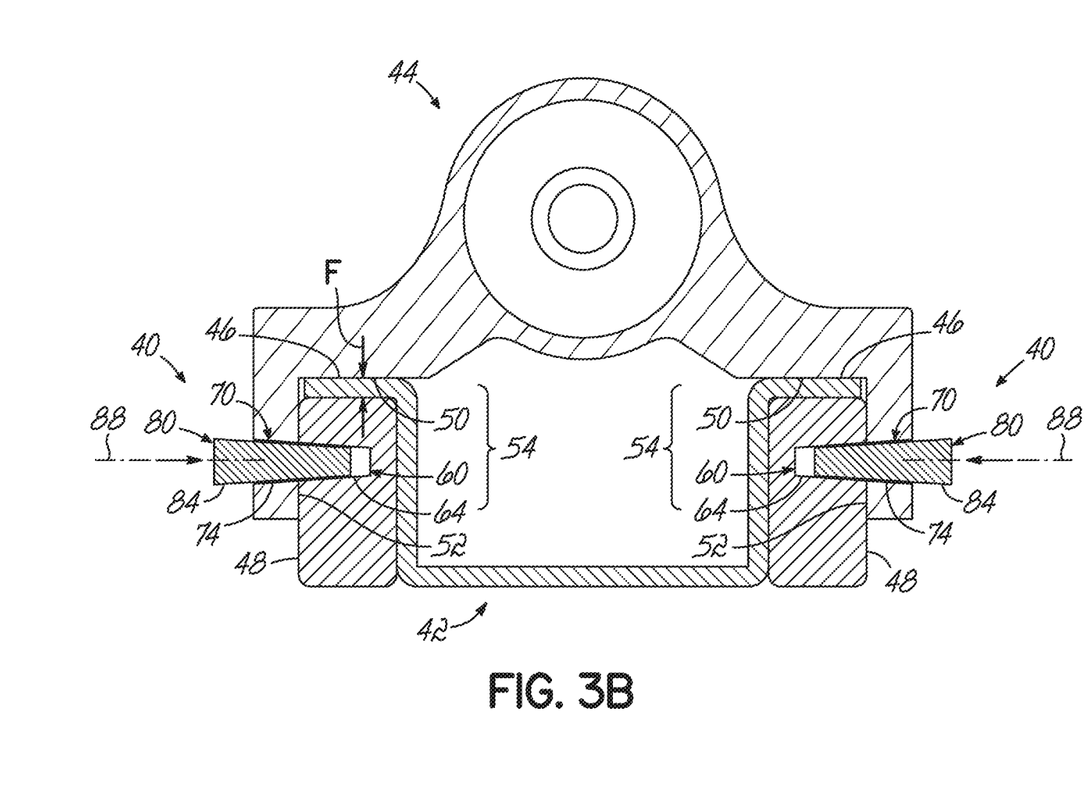
FIG. 3B is an assembled cross-sectional view of the two wind turbine components shown in FIG. 3A.

FIGS. 3A and 3B illustrate a connection system 40 for the joining of two wind turbine components 42, 44 in accordance with an exemplary embodiment of the invention. In an exemplary embodiment, the first wind turbine component 42 includes one or more bearing surfaces 46 and one or more support surfaces 48 extending away from the one or more bearing surfaces 46. The one or more bearing surfaces 46 are generally configured to support the weight and loads presented by the second wind turbine component 44. By way of example and without limitation, the one or more bearing surfaces 46 may be configured to bear the entire vertical load presented by the second wind turbine component 44. In an alternative embodiment, however, the one or more bearing surfaces 46 may be configured to bear no less than 75%, preferably no less than 85%, and even more preferably no less than 90% of the vertical load presented by the second wind turbine component 44. In an exemplary embodiment, the one or more bearing surfaces 46 may be generally horizontal surfaces, however the one or more bearing surfaces 46 are not limited to such an orientation.

The first wind turbine component 42 may include a single continuous bearing surface 46 or may include a plurality of discrete bearing surfaces. By way of example, FIGS. 3A and 3B illustrate the first wind turbine component 42 having two bearing surfaces 46 separated from each other. The number of bearing surfaces may depend of the specific application, size of the connection, and possibly other factors, and the invention should not be limited to any particular number of bearing surfaces 46. The one or more bearing surfaces 46 may form a portion of the body of the first wind turbine component 42 or may be part of a dedicated flange or element specifically configured to provide the one or more bearing surfaces 46.

The one or more support surfaces 48 are generally not configured to directly support the weight and loads presented by the second wind turbine component 44, but instead are primarily configured to support the one or more bearing surfaces 46 in that function. In an exemplary embodiment, the one or more support surfaces 48 may be configured to bear substantially none of the vertical load presented by the second wind turbine component 44. In an alternative embodiment, however, the one or more support surfaces may be configured to bear no more than 15%, preferably no more than 10%, and even more preferably no more than 5% of the vertical load presented by the second wind turbine component 44. In an exemplary embodiment, the one or more support surfaces 48 may be generally vertical surfaces, however the one or more support surfaces 48 are not limited to such an orientation.

The first wind turbine component 42 may include a single continuous support surface 48 or may include a plurality of discrete support surfaces. By way of example, FIGS. 3A and 3B illustrate the first wind turbine component 42 having two support surfaces 48 separated from each other. The number of support surfaces may depend of the specific application, size of the connection, and possibly other factors, and the invention should not be limited to any particular number of support surfaces 48. The one or more support surfaces 48 may form a portion of the body of the first wind turbine component 42 or may be part of a dedicated flange or element specifically configured to provide the one or more support surfaces 48. In an exemplary embodiment, the one or more support surfaces 48 may extend directly from the one or more bearing surfaces 46, as illustrated in FIGS. 3A and 3B. By way of example, the one or more support surfaces 48 may extend from the one or more bearing surfaces 46 in a substantially perpendicular manner (e.g., 90°±2°). In an alternative embodiment, however, the one or more support surfaces 48 may extend from the one or more bearing surfaces 46 at other angles. In yet another alternative embodiment, the one or more support surfaces 48 may not extend directly from the one or more bearing surfaces 46, but may be oriented in space relative to and spaced from the one or more bearing surfaces 46.

Turning now to the second wind turbine component 44, it has a configuration similar to the first wind turbine component 42 and includes one or more bearing surfaces 50 and one or more support surfaces 52 extending away from the one or more bearing surfaces 50. The weight and loads presented by the second wind turbine component are configured to be supported by the first wind turbine component 42 through the one or more bearing surfaces 50. By way of example and without limitation, the one or more bearing surfaces 50 may be configured to bear the entire vertical load presented by the second wind turbine component 44. In an alternative embodiment, however, the one or more bearing surfaces 50 may be configured to bear no less than 75%, preferably no less than 85%, and even more preferably no less than 90% of the vertical load presented by the second wind turbine component 44. In an exemplary embodiment, the one or more bearing surfaces 50 may be generally horizontal surfaces, however the one or more bearing surfaces 50 are not limited to such an orientation.

The second wind turbine component 44 may include a single continuous bearing surface 50 or may include a plurality of discrete bearing surfaces. By way of example, FIGS. 3A and 3B illustrate the second wind turbine component 44 having two bearing surfaces 50 separated from each other. The number of bearing surfaces may depend of the specific application, size of the connection, and possibly other factors, and the invention should not be limited to any particular number of bearing surfaces 50. The one or more bearing surfaces 50 may form a portion of the body of the second wind turbine component 44 or may be part of a dedicated flange or element specifically configured to provide the one or more bearing surfaces 50.

The one or more support surfaces 52 are generally not configured to directly support the weight and loads presented by the second wind turbine component 44, but instead are primarily configured to support the one or more bearing surfaces 52 in that function. In an exemplary embodiment, the one or more support surfaces 52 may be configured to bear substantially none of the vertical load presented by the second wind turbine component 44. In an alternative embodiment, however, the one or more support surfaces may be configured to bear no more than 15%, preferably no more than 10%, and even more preferably no more than 5% of the vertical load presented by the second wind turbine component 44. In an exemplary embodiment, the one or more support surfaces 52 may be generally vertical surfaces, however the one or more support surfaces 52 are not limited to such an orientation.

The second wind turbine component 44 may include a single continuous support surface 52 or may include a plurality of discrete support surfaces. By way of example, FIGS. 3A and 3B illustrate the second wind turbine component 44 having two support surfaces 52 separated from each other. The number of support surfaces may depend of the specific application, size of the connection, and possibly other factors, and the invention should not be limited to any particular number of support surfaces 52. The one or more support surfaces 52 may form a portion of the body of the second wind turbine component 44 or may be part of a dedicated flange or element specifically configured to provide the one or more support surfaces 52. In an exemplary embodiment, the one or more support surfaces 52 may extend directly from the one or more bearing surfaces 50, as illustrated in FIGS. 3A and 3B. By way of example, the one or more support surfaces 52 may extend from the one or more bearing surfaces 50 in a substantially perpendicular manner (e.g., 90°±2°). In an alternative embodiment, however, the one or more support surfaces 52 may extend from the one or more bearing surfaces 50 at other angles. In yet another alternative embodiment, the one or more support surfaces 52 may not extend directly from the one or more bearing surfaces 50, but may be oriented in space relative to and spaced from the one or more bearing surfaces 50.

When the first and second wind turbine components 42, 44 are brought together, the one or more bearing surfaces 46 of the first wind turbine component 42 may be configured to confront the one or more bearing surfaces 50 of the second wind turbine component 44. In an exemplary embodiment, the one or more bearing surfaces 46 of the first wind turbine component 42 may be configured to engage with, for example directly engage with and be in contact with, the one or more bearing surfaces 50 of the second wind turbine component 44. By way of example, the contacting interface between the respective bearing surfaces 46, 50 may have a generally horizontal orientation. In a similar manner, the one or more support surfaces 48 of the first wind turbine component 42 may be configured to confront the one or more support surfaces 52 of the second wind turbine component 44. In one embodiment, the one or more support surfaces 48 of the first wind turbine component 42 may be configured to engage with the one or more support surfaces 52 of the second wind turbine component 44. For example, there may be a slight frictional fit between the support surfaces 48, 52. In an alternate embodiment, however, the respective support surfaces 48, 52 may be slightly spaced from each other. By way of example, the contacting interface between the respective support surfaces 48, 52 may have a generally vertical orientation. As illustrated in FIGS. 3A and 3B, the particular arrangement between the first and second wind turbine components 42, 44 provides an overlap region 54 between the two wind turbine components 42, 44. This overlap region 54 may occur over at least a portion of the support surfaces 48, 52 of the wind turbine components 42, 44.

As noted above, in a conventional approach, numerous bolted connections would be placed through the bearing surfaces 46, 50 of the wind turbine components 42, 44 in order to secure the two wind turbine components together. More particularly, and in reference to FIGS. 3A and 3B, bolts would extend generally vertically through the generally horizontal bearing surfaces 46, 50. In other words, the bolts would extend in a direction generally perpendicular to the contacting interface between the bearing surfaces 46, 50. In accordance with one aspect of the invention, however, the positive connection between the first and second wind turbine components 42, 44 is moved away from the one or more bearing surfaces 48, 50. In this regard, a positive connection between the first and second wind turbine components 42, 44 is repositioned so as to be along the respective one or more support surfaces 48, 52 of the first and second wind turbine components 42, 44. Additionally, instead of utilizing bolted connections, in accordance with another aspect of the invention, one or more tapered pin connections may be used to couple the two wind turbine components 42, 44 together. Moreover, the orientation of the tapered pin connections has been changed relative to the conventional bolted connections. More particularly, the tapered pins extend in a direction generally parallel to the interface between the bearing surfaces 46, 50.

To this end, the connection system 40 may include bores positioned in the one or more support surfaces 48, 52 of the first and second wind turbine components 42, 44. More particularly, the first wind turbine component 42 may include one or more bores 60 in the one or more support surfaces 46. In an exemplary embodiment, at least a portion of the one or more bores 60 has a tapered configuration or profile. In one embodiment, the one or more bores 60 may be blind bores having an opened end 62, a sidewall 64 and a closed end 66. The cross dimension, such as the diameter, of the one or more bores 60 may be configured to decrease in a direction from the open end 62 toward the closed end 66. By way of example, the taper may be defined by a taper angle between about 2° and about 10°. Other taper angles may also be possible. The tapered configuration of the one or more bores 60 may be generally along the entire length of the one or more bores 60 (as illustrated in the figures) or may be along only a portion of the length of the bores, such as along the distal end of the one or more bores 60 (not shown). In an exemplary embodiment, the length of one or more bores 60 may be between about 1 to about 3 times the diameter of the bores 60 at the open end 62. Thus, for example, the one or more bores 60 may have a length between about 100 mm to about 300 mm and have a maximum diameter at the open end 62 between about 75 mm to about 100 mm. While the one or more bores 60 in the one or more support surfaces 48 of the first wind turbine component 42 are described above as a blind bore, it should be recognized that in an alternative embodiment, the one or more bores 60 may be configured as through bores having two open ends and a tapered side wall extending therebetween. The one or more bores 60 may be formed in the one or more support surfaces 48 of the first wind turbine component 42 using conventional techniques, such as boring, drilling, milling, reaming, etc.

In a similar manner, the second wind turbine component 44 includes one or more bores 70 in the one or more support surfaces 52. In an exemplary embodiment, at least a portion of the one or more bores 70 has a tapered configuration or profile. In one embodiment, the one or more bores 70 may be through bores having an opened end 72, a sidewall 74 and another opened end 76. The cross dimension, such as the diameter, of the one or more bores 70 may be configured to decrease in a direction from the first opened end 72 toward the second opened end 76. By way of example, the taper may be defined by a taper angle between about 2° and about 10°. Other taper angles may also be possible. The taper of the one or more bores 70 in the second wind turbine component 44 may be substantially the same as the taper of the one or more bores 60 in the first wind turbine component 42. The tapered configuration of the one or more bores 70 may be generally along the entire length of the one or more bores 70. In an exemplary embodiment, the length of one or more bores 60 may be between about 1 to about 3 times the diameter of the bores 70 at the first opened end 72. Thus, for example, the one or more bores 70 may have a length between about 100 mm to about 300 mm and have a maximum diameter at the open end 62 between about 75 mm to about 100 mm. The one or more bores 70 may be formed in the one or more support surfaces 52 of the second wind turbine component 44 using conventional techniques, such as boring, drilling, milling, reaming, etc.

The connection system 40 further includes one or more pins 80 configured to be positioned into the one or more bores 60, 70 of the first and second wind turbine components 42, 44 to thereby secure the two wind turbine components together. In an exemplary embodiment, at least a portion of the one or more pins 80 has a tapered configuration or profile. The pins 80 include a first end 82, a sidewall 84, and a second end 86. The pins 80 may be generally cylindrical and generally define a pin axis 88. The cross dimension, such as the diameter, of the one or more pins 80 may be configured to decrease in a direction from the first end 82 toward the second end 86. By way of example, the taper may be defined by a taper angle between about 2° and about 10°. Other angles may also be possible. The taper of the one or more pins 80 may be just slightly larger than the taper of the one or more bores 60 in the first wind turbine component 42 and/or the one or more bores 70 in the second wind turbine component 44. The tapered configuration of the one or more pins 80 may be generally along the entire length of the one or more pins 80. In an exemplary embodiment, the length of one or more pins 80 may be between about 2 to about 5 times the diameter of the pins 80 at the first end 82. Thus, for example, the one or more bores 70 may have a length between about 200 mm to about 600 mm and have a maximum diameter at the first end 82 between about 100 mm to about 200 mm. The pins 80 may be formed from any suitable material capable of withstanding the loads imposed on the pins 80 during operation of the wind turbine 10. By way of example, the pins 80 may be formed from steel or other suitable metal materials.

To ensure having the pin engaged with no gap in the shear force area, it may be advantageous to have the right level of pretension on the outside of the pin e.g. by using a spring fixed by a bolt/plate. If small movements occur in the interface, the pretensioned pin will then always ensure that the pin is engaged in the right way. The spring can be one of many types known to a skilled person, including using a pretensioned bolt, which also technically is a spring.

As illustrated in FIGS. 3A and 3B, to join the first and second wind turbine components 42, 44 together, the first and second components 42, 44 may be positioned in proximity to each other such that the one or more bearing surfaces 46, 50 and the one or more support surfaces 48, 52 confront one another, and in at least the case of the one or more bearing surfaces 46, 50, the surfaces may be arranged to be in contact with each other. During this process, the one or more bores 60, 70 in the one or more support surfaces 48, 52 of the first and second wind turbine components 42, 44 may be generally aligned with each other. At this point, the one or more pins 80 may be inserted into the one or more bores 60, 70. By way of example, this may be accomplished using a hydraulic hammer or similar device for inserting the one or more pins 80 into the bores 60, 70 with sufficient force. As is clearly observed in FIG. 3B, the positive connection between the two wind turbine components 42, 44 is spaced from the one or more bearing surfaces 46, 50. Additionally, the axis of the one or more pins 80 extends in a direction that is generally parallel to the orientation of the one or more bearing surfaces 46, 50. By way of example, the axis 88 of the one or more pins 80 may extend in a generally horizontal direction.

In one aspect of the invention, the tapered configuration of the one or more pins 80 and the one or more bores 60 and/or 70 provide a self-alignment feature that allows the two wind turbine components to become aligned with placement of the pins 80. This aspect may offer certain benefits unattainable with bolted connections. In this regard, for example, the acceptable tolerances in locating the bores 60, 70 in the first and second wind turbine components 42, 44 may be significantly decreased compared to that in the conventional bolted connection. As noted above, due to the large number of bolted connections typically used to join the two components together, high manufacturing tolerances have to be used to ensure proper alignment of the many bores. In accordance with the present invention, the tapered configuration of the pins 80 and bores 60, 70 allows slight misalignments to be accommodated while still providing a strong connection between the two wind turbine components 42, 44. Accordingly, lower tolerance manufacturing methods may be implemented in aspects of the present invention.

Furthermore, the reorientation of the pin axis 88 so as to be generally parallel to the one or more bearing surfaces 46, 50 means that the pins 80 would have to fail in shear (i.e., shear through the diameter thickness of the pins 80). The pins 80, however, are very strong in shear, resulting in a very strong connection between the first and second wind turbine components 42, 44. For example, it is believed that the material that surrounds and defines the one or more bores 60, 70 would start deforming before the one or more pins 80 would fail in shear. Due to the high strength of the tapered pin connections, it is further believed that the number of connections may be significantly reduced compared to bolted connections. By way of example and without limitation, it is believed that the number of connections may be reduced by 50%, preferably by 70%, and even more preferably by more than 80%. Thus, for example, a coupling between two wind turbine components that in the normal course would use between about 30-40 bolted connections to join the two components may now be joined using between about 4-16 connections. The reduction in the number of pin connections reduces assembly/disassembly time and labor, which results in significant cost reductions.

The tapered configuration of the one or more pins 80 and one or more bores 60, 70 may further provide a clamping preload F (FIG. 3B) to be imposed in the joint. In this regard, as the one or more pins 80 are inserted into the bores 60, 70 the two wind turbine components 42, 44 are brought closer together in forceful contact with each other. The clamping force between the two wind turbine components 42, 44 may be varied and/or controlled to a certain extent by the amount the one or more pins 80 are inserted into the bores 60, 70. Thus, to increase the clamping force (or pressure) between the two wind turbine components 42, 44, the one or more pins 80 should be inserted further into the one or more bores 60, 70. The penetration depth of the one or more pins 80 in the bores 60, 70 may be controlled by the hydraulic hammer or other device for inserting the pins 80.

In the embodiment illustrated in FIGS. 3A and 3B, the first wind turbine component 42 includes at least a portion of the base frame 34 of the nacelle 14 and the second wind turbine component 44 includes at least a portion of the main bearing assembly 28. Thus, the connection system 40 is an improved way to couple the main bearing assembly 28 to the base frame 34 of the wind turbine 10. The invention, however, may have wider applications in the wind turbine environment and should not be limited to the connection between the main bearing assembly 28 and the base frame 34. By way of example, the connection system 40 may be used to join any number of wind turbine components together. For example, the connection system 40 described herein may be used to join the gearbox 30 to the base frame 34 or other supporting structure. The connection system 40 may further be used to join the generator 18 to the base frame 34 or other supporting structure.

Figure 4:
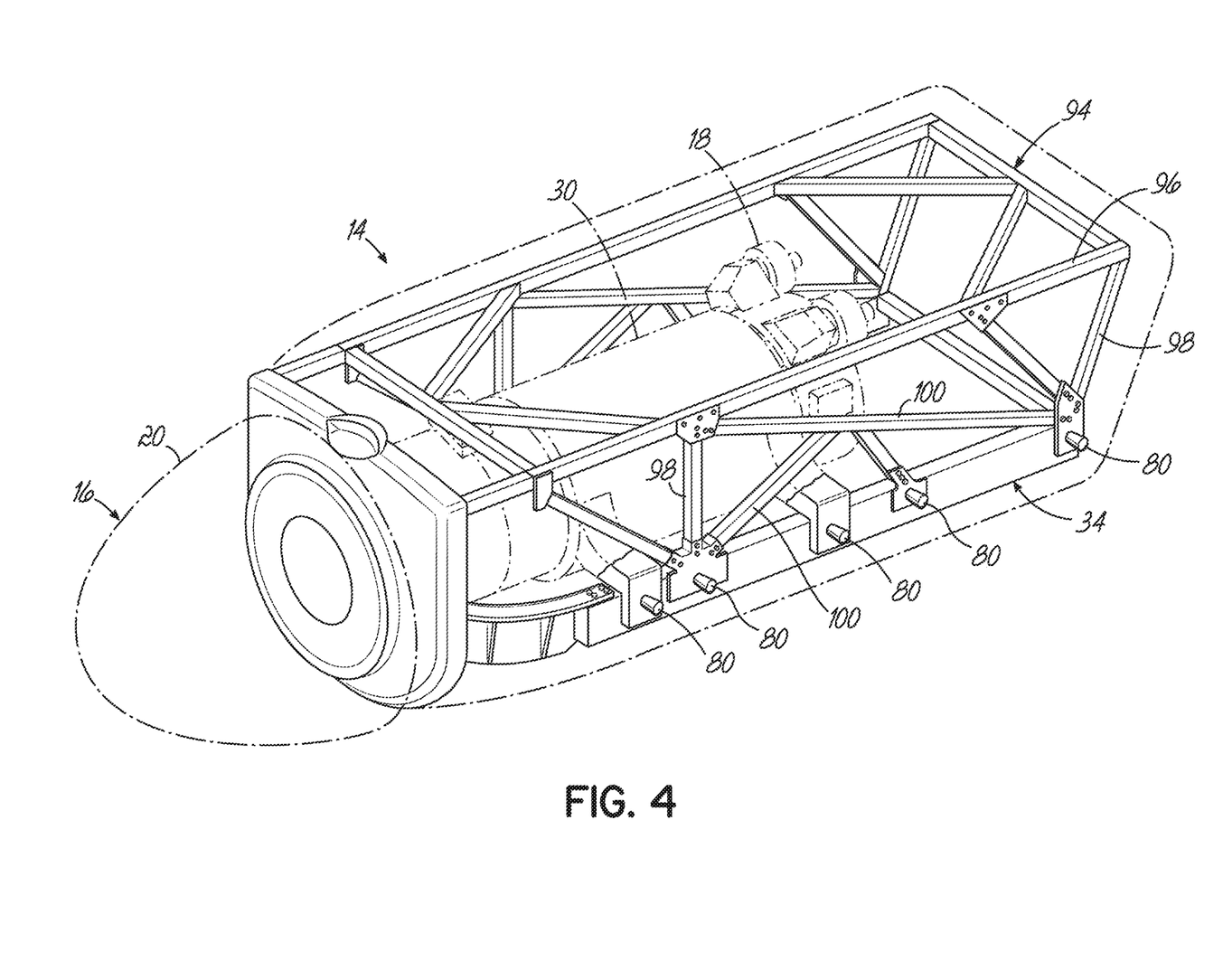
FIG. 4 is a perspective view of a nacelle illustrating a support frame for the nacelle.
Figure 5:
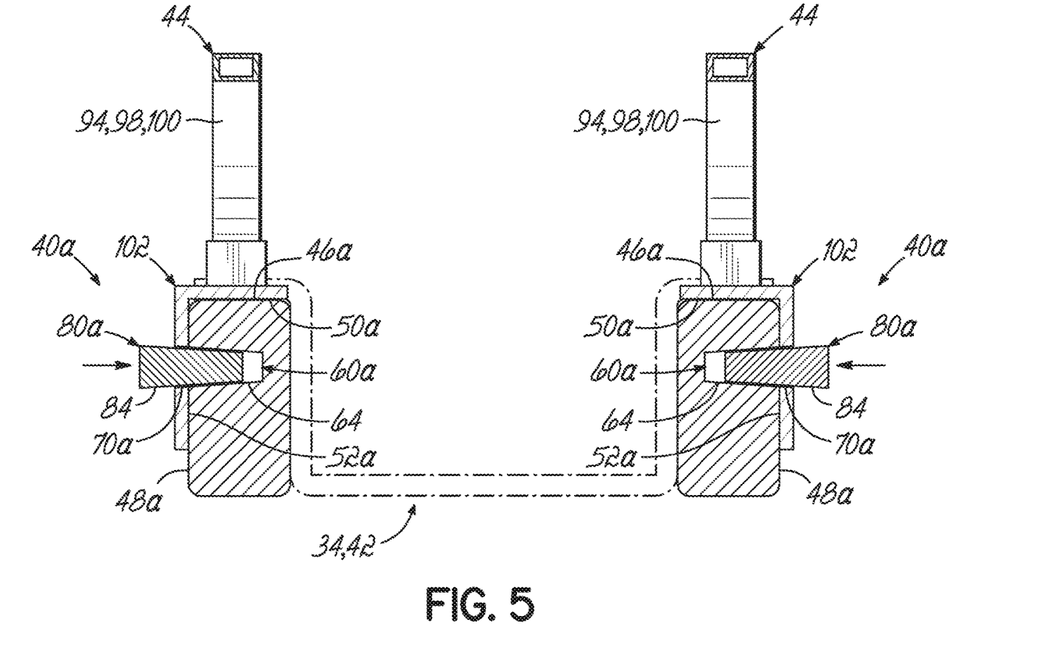
FIG. 5 is cross-sectional view of a connection system for connecting two wind turbine components together in accordance with another embodiment of the invention.

FIG. 4 illustrates another embodiment in which a connection system in accordance with aspects of the invention may be implemented. FIG. 4 illustrates a number of structural elements of the nacelle 14 in addition to the base frame 34. In this regard, the nacelle 14 may include a number of structural beams or supports 94 including, for example, an upper beam 96, vertical beams 98, and a number of cross beams 100 latticed together to form a nacelle frame. One or more of the structural beams 94 may be coupled to the base frame 34 or to each other, such as a cross beam 100 being coupled to the upper beam 96. FIG. 5, in which similar reference numbers refer to similar features from FIGS. 3A and 3B, illustrates a connecting system 40*a* in accordance with another embodiment of the invention. The connecting system 40*a* is configured to join one of the structural beams 94 of the nacelle 14 and the base frame 34. Thus, the first wind turbine component 42 may include portions of the base frame 34 and the second wind turbine component 44 may include one or more of the structural beams 94.

Similar to the above, the first wind turbine component 42 may include one or more bearing surfaces 46*a* and one or more support surfaces 48*a* extending away from the one or more bearing surfaces 46*a*, and the second wind turbine component 44 may also include one or more bearing surfaces 50*a* and one or more support surfaces 52*a* extending away from the one or more bearing surfaces 50*a*. To this end, the structural beams 94 may include an end plate 102 or similar plate member that defines the one or more bearing surfaces 50*a* and the one or more support surfaces 52*a*. The first wind turbine component 42 includes one or more bores 60*a* formed in the one or more support surfaces 48*a* and the second wind turbine component 44 includes one or more bores 70*a* formed in the one or more support surfaces 52*a*. One or more tapered pins 80*a* may be engaged with the bores 60*a*, 70*a* in the manner described above to join the first and second wind turbine components 42, 44 together.

Figure 6:
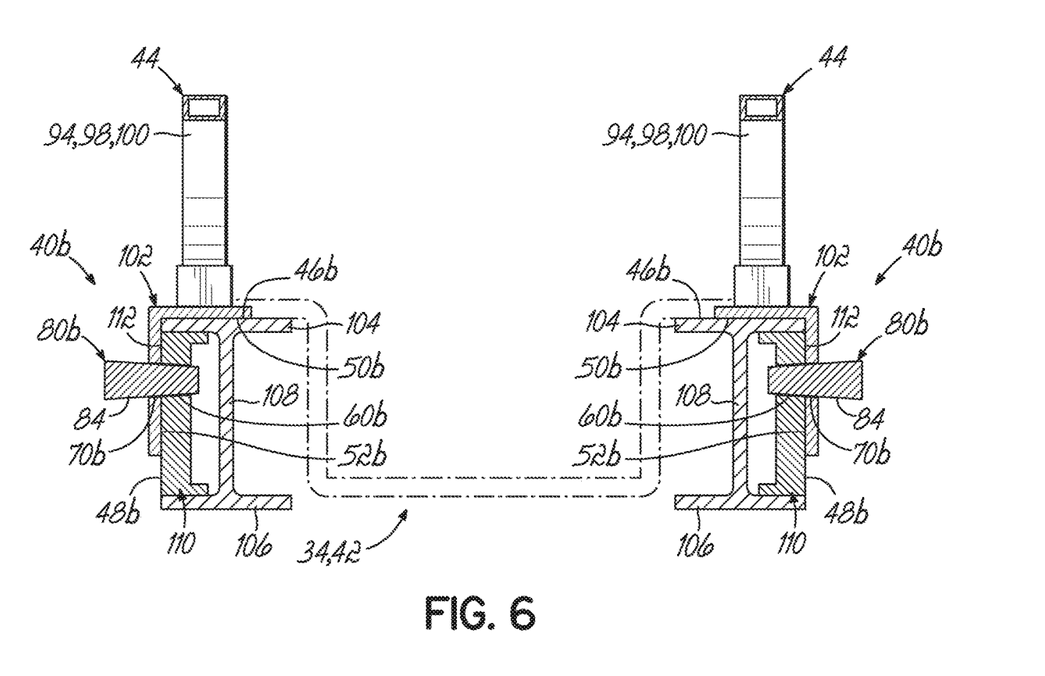
FIG. 6 is a cross-sectional view of a connection system for connecting two wind turbine components together in accordance with another embodiment of the invention.

FIG. 6 illustrates an alternative embodiment similar to that shown in FIG. 5. FIG. 6, in which similar reference numbers refer to similar features from FIGS. 3A and 3B, illustrates a connecting system 40*b* in accordance with another embodiment of the invention. The connecting system 40*b* is configured to join one of the structural beams 94 of the nacelle 14 and the base frame 34. Thus, the first wind turbine component 42 may include portions of the base frame 34 and the second wind turbine component 44 may include one or more of the structural beams 94. The primary difference between FIGS. 5 and 6 is the form that the first wind turbine component 42 takes. In this regard, the first wind turbine component 42 illustrated in FIGS. 3A, 3B and 5 includes aspects of the base frame 34 as having a solid construction. In some cases, however, aspects of the base frame 34 may be formed by I-beams having an upper flange 104, a lower flange 106, and a central web 108. In accordance with an aspect of the invention, the I-beam includes a block or plug 110 coupled to one or both of the upper and lower flanges 104, 106. For example, the plug 110 may be secured to and extending between the upper and lower flanges 104, 106. The plug 110 includes a surface 112 that forms part of the support surface 48*b* for the connecting system 40*b*. The plug 110 includes the tapered bore 60*b*, which in this embodiment may be formed as a through bore extending through the plug 110. One or more tapered pins 80*b* may be engaged with the bores 60*b*, 70*b* in the manner described above to join the first and second wind turbine components 42, 44 together.

Figure 7:
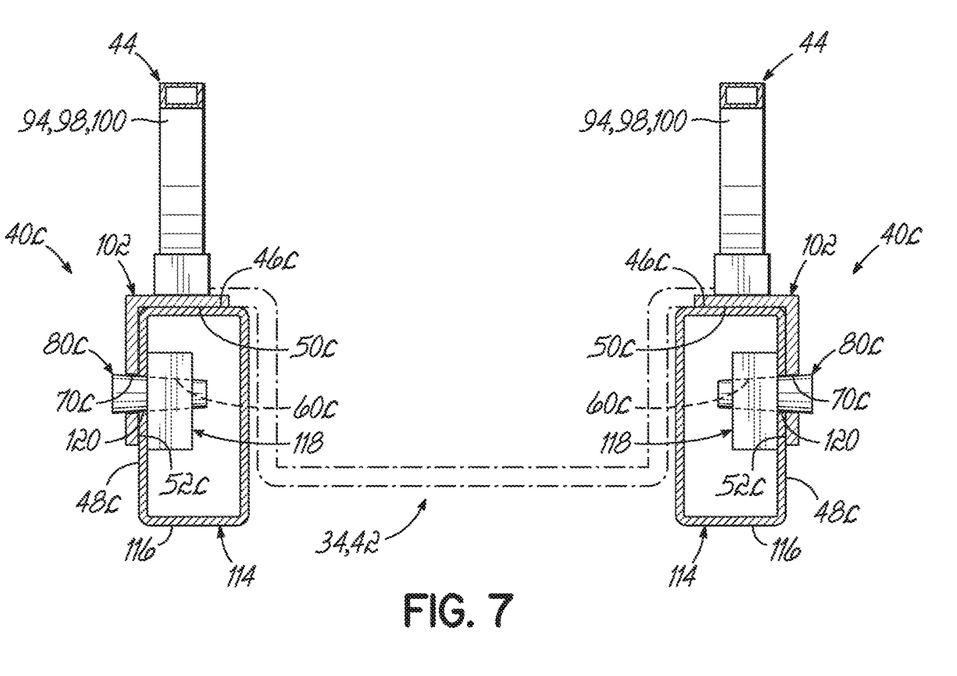
FIG. 7 is a cross-sectional view of a connection system for connecting two wind turbine components together in accordance with another embodiment of the invention.

FIG. 7 illustrates an alternative embodiment similar to that shown in FIGS. 5 and 6. FIG. 7, in which similar reference numbers refer to similar features from FIGS. 3A and 3B, illustrates a connecting system 40*c* in accordance with another embodiment of the invention. The connecting system 40*c* is configured to join one of the structural beams 94 of the nacelle 14 and the base frame 34. Thus, the first wind turbine component 42 may include portions of the base frame 34 and the second wind turbine component 44 may include one or more of the structural beams 94. The primary difference between FIGS. 5 and 6 and FIG. 7 is the form that the first wind turbine component 42 takes. In this regard, the first wind turbine component 42 illustrated in FIGS. 3A, 3B and 5 includes aspects of the base frame 34 as having a solid construction. In some cases, however, aspects of the base frame 34 may be formed by a hollow beam 114 defined by an outer shell 116. In accordance with an aspect of the invention, the hollow beam 114 includes a block or plug 118 coupled to an inner wall of the outer shell 116. The plug 118 includes a bore 60*c* that cooperates with an opening 120 in the outer shell 116. The tapered bore 60*c* may be formed as a through bore extending through the plug 118. Alternatively, the bore 60*c* may be formed as a blind bore. One or more tapered pins 80*c* may be engaged with the bores 60*c*, 70c, 120 in the manner described above to join the first and second wind turbine components 42c, 44c together.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine nacelle comprising:
    a first wind turbine component of the nacelle;
    a second wind turbine component of the nacelle; and
    a connection system for joining the first wind turbine component and the second wind turbine component, comprising:
        on the first wind turbine component, one or more bearing surfaces, one or more support surfaces extending away from the one or more bearing surfaces, and one or more bores formed in the one or more support surfaces;
        on the second wind turbine component, one or more bearing surfaces, one or more support surfaces extending away from the one or more bearing surfaces, and one or more bores formed in the one or more support surfaces; and
        one or more pins engaged with respective one or more bores of the first and second wind turbine components to thereby join the first and second wind turbine components together,
    wherein when the first and second wind turbine components are joined, the first and second wind turbine components are positioned relative to each other such that the one or more bearing surfaces oppose each other, the one or more support surfaces oppose each other, and the one or more bores in the first and second wind turbine components are generally aligned with each other or become generally aligned with each other upon engagement of the one or more pins,
    wherein the first wind turbine component includes the base frame of the nacelle, and
    wherein the second wind turbine component includes the main bearing assembly.

2. The nacelle according to claim 1, wherein the one or more bearing surfaces of the first wind turbine component are oriented in a substantially horizontal direction.

3. The nacelle according to claim 1, wherein the one or more support surfaces of the first wind turbine component are oriented in a substantially vertical direction.

4. The nacelle according to claim 1, wherein the one or more bearing surfaces of the second wind turbine component are oriented in a substantially horizontal direction.

5. The nacelle according to claim 1, wherein the one or more support surfaces of the second wind turbine component are oriented in a substantially vertical direction.

6. The nacelle according to claim 1, wherein the one or more support surfaces extend away from the one or more bearing surfaces in a substantially perpendicular direction on the first wind turbine component.

7. The nacelle according to claim 1, wherein the one or more support surfaces extend away from the one or more bearing surfaces in a substantially perpendicular direction on the second wind turbine component.

8. The nacelle according to claim 1, wherein the one or more pins have a tapered profile.

9. The nacelle according to claim 1, wherein the connection system is configured to enable said one or more pins to be kept in place at least by the assistance of pretension on the outside of the pin.

10. The nacelle according to claim 1, wherein the one or more bores in the first and/or second wind turbine component have a tapered profile.

11. A wind turbine having the nacelle of claim 1.

12. A wind turbine nacelle comprising:
    a first wind turbine component of the nacelle;
    a second wind turbine component of the nacelle; and
    a connection system for joining the first wind turbine component and the second wind turbine component, comprising:
        on the first wind turbine component, one or more bearing surfaces, one or more support surfaces extending away from the one or more bearing surfaces, and one or more bores formed in the one or more support surfaces;
        on the second wind turbine component, one or more bearing surfaces, one or more support surfaces extending away from the one or more bearing surfaces, and one or more bores formed in the one or more support surfaces; and
        one or more pins engaged with respective one or more bores of the first and second wind turbine components to thereby join the first and second wind turbine components together,
    wherein when the first and second wind turbine components are joined, the first and second wind turbine components are positioned relative to each other such that the one or more bearing surfaces oppose each other, the one or more support surfaces oppose each other, and the one or more bores in the first and second wind turbine components are generally aligned with each other or become generally aligned with each other upon engagement of the one or more pins,
    wherein the first wind turbine component includes the base frame of the nacelle, and
    wherein the second wind turbine component includes a structural beam of the nacelle frame.

13. A method of joining a first wind turbine component and a second wind turbine component of a nacelle of a wind turbine, comprising:
    providing the first wind turbine component of the nacelle with one or more bearing surfaces, one or more support surfaces extending away from the one or more bearing surfaces, and one or more bores formed in the one or more support surfaces;
    providing the second wind turbine component of the nacelle with one or more bearing surfaces, one or more support surfaces extending away from the one or more bearing surfaces, and one or more bores formed in the one or more support surfaces;
    positioning the first wind turbine component relative to the second wind turbine component such that the one or more bearing surfaces of the first and second components oppose each other, the one or more support surfaces of the first and second components oppose each other, and the one or more bores of the first and second components are generally aligned with each other;
    engaging one or more pins with the one or more bores in the first and second wind turbine components to thereby join the first and second wind turbine components together, wherein the first wind turbine component includes the base frame of the nacelle, and wherein positioning the first and second wind turbine components relative to each other further comprises positioning the first and second wind turbine components such that the one or more bearing surfaces contact each other.

14. The method of claim 13, wherein the one or more pins have a tapered profile and the one or more bores in the first and/or second wind turbine component have a tapered profile, and wherein engaging the one or more pins with the one or more bores of the first and second wind turbine components further comprises:

engaging the one or more pins with the one or more bores to produce a clamping force between the first and second wind turbine components.

15. The method of claim 14, further comprising increasing or decreasing the depth of engagement of the one or more pins with the one or more bores to vary the clamping force between the first and second wind turbine components.

16. The method according to claim 13, wherein engaging the one or more pins with the one or more bores further comprises:

inserting the one or more pins in the one or more bores by movement of the one or more pins in a direction generally parallel to the one or more bearing surfaces of the first and second wind turbine components.

17. The method according to claim 13, wherein engagement of the one or more pins with the one or more bores in the first and second wind turbine components causes the one or more bores to become more aligned with each other.

18. The method according to claim 13, wherein said one or more pins are kept in place at least by the assistance of pretension on the outside of the pin.

19. A wind turbine nacelle comprising:
a first wind turbine component of the nacelle;
a second wind turbine component of the nacelle; and
a connection system for joining the first wind turbine component and the second wind turbine component, comprising:
  on the first wind turbine component, one or more bearing surfaces, one or more support surfaces extending away from the one or more bearing surfaces, and one or more bores formed in the one or more support surfaces;
  on the second wind turbine component, one or more bearing surfaces, one or more support surfaces extending away from the one or more bearing surfaces, and one or more bores formed in the one or more support surfaces; and
  one or more pins engaged with respective one or more bores of the first and second wind turbine components to thereby join the first and second wind turbine components together, wherein when the first and second wind turbine components are joined, the first and second wind turbine components are positioned relative to each other such that the one or more bearing surfaces oppose each other, the one or more support surfaces oppose each other, and the one or more bores in the first and second wind turbine components are generally aligned with each other or become generally aligned with each other upon engagement of the one or more pins, wherein the first wind turbine component includes the base frame of the nacelle, and wherein the second wind turbine component includes a gearbox and/or a generator.

20. A wind turbine nacelle comprising:
a first wind turbine component of the nacelle;
a second wind turbine component of the nacelle; and
a connection system for joining the first wind turbine component and the second wind turbine component, comprising:
  on the first wind turbine component, one or more bearing surfaces, one or more support surfaces extending away from the one or more bearing surfaces, and one or more bores formed in the one or more support surfaces;
  on the second wind turbine component, one or more bearing surfaces, one or more support surfaces extending away from the one or more bearing surfaces, and one or more bores formed in the one or more support surfaces; and
  one or more pins engaged with respective one or more bores of the first and second wind turbine components to thereby join the first and second wind turbine components together, wherein when the first and second wind turbine components are joined, the first and second wind turbine components are positioned relative to each other such that the one or more bearing surfaces contact each other, the one or more support surfaces oppose each other, and the one or more bores in the first and second wind turbine components are generally aligned with each other or become generally aligned with each other upon engagement of the one or more pins, wherein the first wind turbine component includes the base frame of the nacelle.

* * * * *